US006368417B1

United States Patent
Weber

(10) Patent No.: US 6,368,417 B1
(45) Date of Patent: Apr. 9, 2002

(54) TIRE MOLD CLEANING METHOD AND APPARATUS

(75) Inventor: David Joseph Weber, Whitehouse, TX (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/719,291
(22) PCT Filed: Apr. 8, 1999
(86) PCT No.: PCT/US99/07746
§ 371 Date: Dec. 7, 2000
§ 102(e) Date: Dec. 7, 2000
(87) PCT Pub. No.: WO00/61347
PCT Pub. Date: Oct. 19, 2000

(51) Int. Cl.$^7$ ................................................. B08B 3/02
(52) U.S. Cl. .................. 134/7; 134/6; 134/8; 134/18; 134/22.1; 134/24; 134/42; 134/172; 451/87; 451/88; 451/89; 451/36; 451/37; 451/38; 451/39; 451/40
(58) Field of Search ............................... 134/6, 7, 172, 134/8, 18, 22.1, 24, 42; 451/87, 88, 89, 36, 37, 38, 39, 40

(56) References Cited

U.S. PATENT DOCUMENTS

| 1,924,018 | A | * | 4/1933 | Begley et al. .................. 18/31 |
| 2,479,299 | A | * | 8/1949 | Biggs et al. ..................... 51/8 |
| 3,905,155 | A | * | 9/1975 | Smith et al. .................. 51/8 R |
| 3,941,537 | A | * | 3/1976 | Abraham ..................... 425/228 |
| 4,918,876 | A | * | 4/1990 | Donath et al. ................. 51/426 |
| 5,385,307 | A | * | 1/1995 | Azar ............................ 241/41 |
| 5,478,426 | A | * | 12/1995 | Wiler et al. .............. 156/272.8 |
| 5,529,636 | A | * | 6/1996 | Nohara et al. ................ 134/1.1 |
| 5,932,026 | A | * | 8/1999 | Trampusch .................... 134/7 |
| 6,004,190 | A | * | 12/1999 | Trampusch .................. 451/89 |

FOREIGN PATENT DOCUMENTS

| DE | 19535557 A1 | * | 9/1995 |
| WO | WO98/07548 | * | 2/1998 |

* cited by examiner

Primary Examiner—Sharidan Carrillo
(74) Attorney, Agent, or Firm—Bruce J. Hendricks; Frederick K. Lacher

(57) ABSTRACT

A method and apparatus for cleaning a tire mold with frozen $CO_2$ cleaning material wherein a portable frame is positioned on a bottom mold of a tire press and has a rotatable frame on which a nozzle support is mounted for swivel action to clean the upper mold half and the lower mold half as the nozzle support is moved radially and circumferentially of the tire mold.

15 Claims, 4 Drawing Sheets

TIRE MOLD CLEANING METHOD AND APPARATUS

TECHNICAL FIELD

This invention relates to tire mold cleaning and especially to automated sidewall cleaning of the tire mold halves without removing the mold halves from the tire press.

BACKGROUND ART

Tire mold cleaning apparatus such as that shown in U.S. Pat. No. 3,905,155 have been designed for cleaning a tire mold while in the press with an abrasive such as glass beads. One of the problems with this type of cleaner is the removal of the spent abrasive from the tire mold. It has been proposed to use frozen $CO_2$ as the abrasive which leaves no residue. With the $CO_2$ cleaning a high noise level is created requiring a sound curtain to be placed around the mold. Enclosures for the mold which are soundproof have been proposed, however, this requires removing the mold from the tire press. The mold cleaner also needs to clean the upper and lower mold halves without removing either of these mold halves from the tire press. This creates a problem in adapting the cleaning apparatus to maintain the spray nozzle at a constant distance from the mold surface while adjusting the position of the spray nozzle to different spacing between the mold halves depending upon the size of the tire press.

SUMMARY OF THE INVENTION

The present invention is directed to a portable tire mold cleaning apparatus for cleaning the sidewall forming surface of the mold with frozen $CO_2$ without removing the mold from the tire press. The mold cleaning apparatus may be transported to the tire press and quickly set up in the breech ring of the press. The spray nozzle is rotated and moved radially as well as axially to follow the contour of the mold. The nozzle is mounted for rotation on a horizontal shaft and can be swiveled from a down position for cleaning the lower mold half to an upper position for cleaning the upper mold half.

In accordance with one aspect of the invention there is provided a cleaning apparatus for cleaning a tire mold mounted in a tire press, the tire press having an upper mold half positioned over a lower mold half and movable vertically to open and close the mold characterized by:

(a) a supporting frame for mounting over said lower mold half and under the upper mold half;

(b) a rotatable frame mounted on the supporting frame for rotation about a horizontal axis;

(c) a nozzle for spraying a cleaning material on mold surfaces of the upper mold half and the lower mold half mounted on a control arm supported on the rotatable frame;

(d) means to rotate the rotatable frame about the horizontal axis to move the control arm from a down position for spraying the cleaning material on the lower mold half to an up position for spraying the cleaning material on the upper mold half; and, (e) means to traverse the control arm circumferentially of the tire mold about a vertical mold axis with the rotatable frame in the down position and in the up position.

In accordance with another aspect of the invention, there is provided a method of cleaning a tire mold having an upper mold half positioned over a lower mold half and movable vertically to open and close said mold with a portable cleaning apparatus having a supporting frame, a rotatable frame mounted on the supporting frame, a nozzle for spraying cleaning material mounted on a control arm supported on the rotatable frame and in communication with a source of cleaning material characterized by the steps of:

(a) mounting the supporting frame over the lower mold half;

(b) rotating the rotatable frame to a position with the control arm in an up position wherein the nozzle in directed at a mold surface of the upper mold half;

(c) communicating cleaning material to a nozzle to project the material against the mold surface of the upper mold half;

(d) traversing the nozzle circumferentially of the upper mold half on the control arm for cleaning the mold surface of the upper mold half;

(e) rotating the rotatable frame to a position with the control arm in a down position wherein the nozzle is directed at a mold surface of the lower mold half;

(f) traversing the nozzle circumferentially of the lower mold half on the control arm for cleaning the mold surface of the lower mold half; and, (g) removing the supporting frame from the lower mold half.

DETAILED DESCRIPTION OF THE INVENTION

Figure 1:
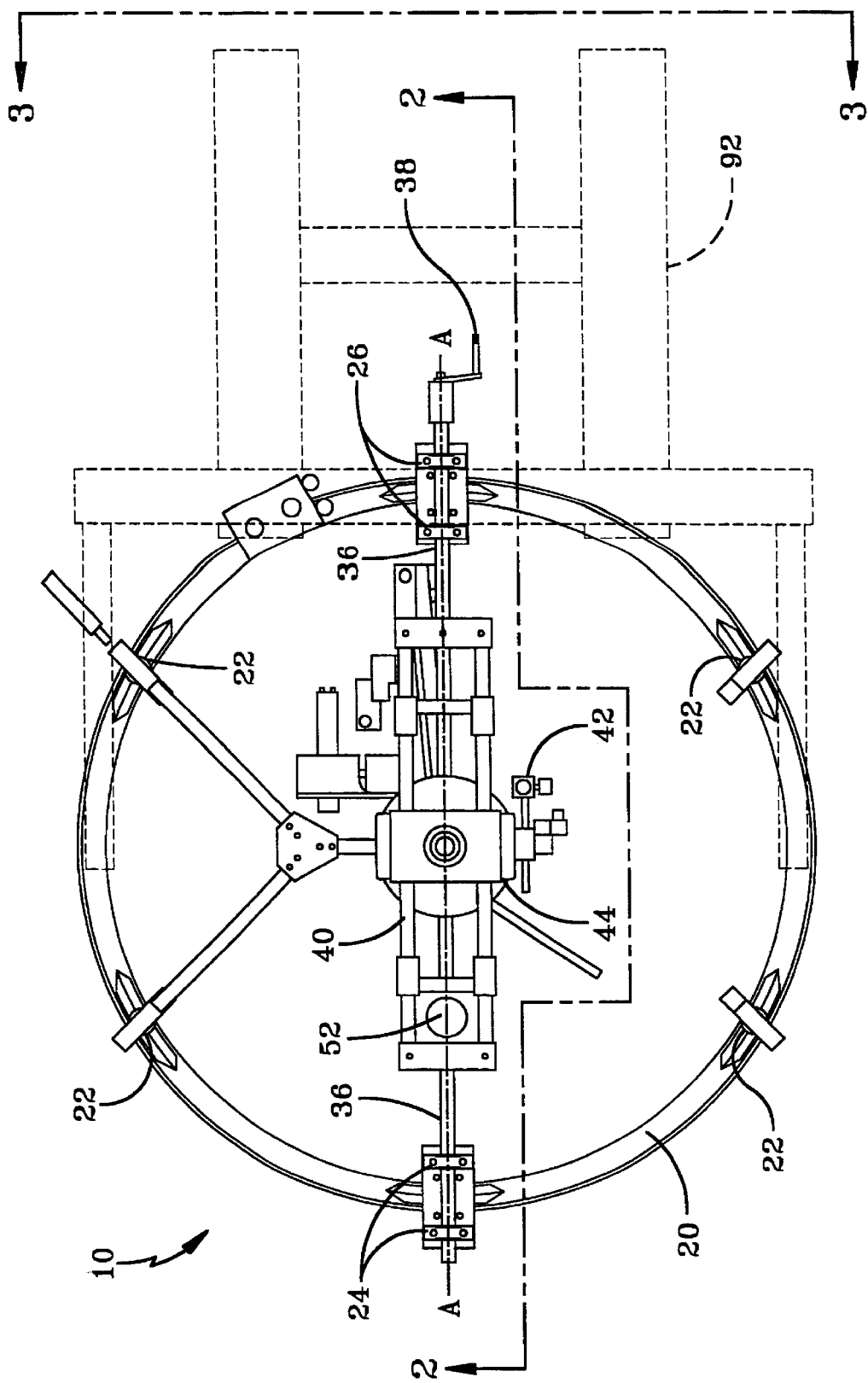
FIG. 1 is a plan view of the portable cleaning apparatus embodying the invention before mounting in a tire press.
Figure 2:
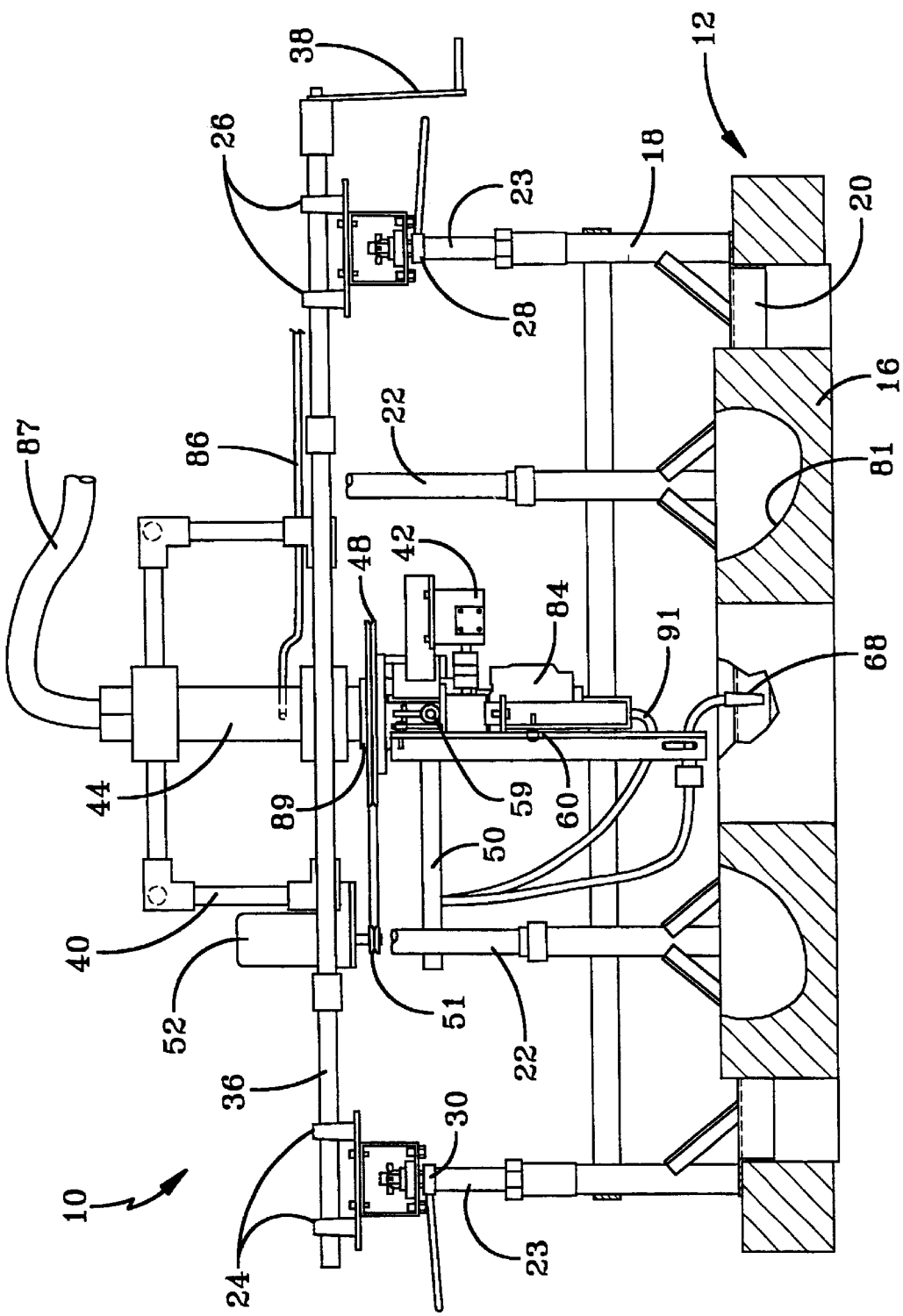
FIG. 2 is a front elevation of the apparatus of FIG. 1 mounted in a tire press taken along line 2—2 in FIG. 1 showing the nozzle in position for cleaning the lower mold half with parts broken away to show the nozzle.

Referring to FIG. 1, a portable mold cleaning apparatus 10 is shown prior to mounting in a tire press 12. In FIG. 2, the apparatus 10 is shown mounted in a lower mold 16. The apparatus 10 has a supporting frame 18 with a cylindrical rolled angle iron base 20, having a diameter for seating in a press breech ring 21. Mounted on the base 20 are adjustable stabilizer legs 22 and side leg assemblies 23. Pillow block bearings 24 and 26 are supported on the side leg assemblies 23 and ratchets 28 and 30 are provided for adjusting the height of the frame 18. A shaft 36 extends through the bearings 24 and 26 from one side of the lower mold half 16 to a rotatable frame 40 and then to the other side where a crank 38 is mounted for tuning the shaft. The rotatable frame 40 supports a frozen $CO_2$ cleaning unit 42.

Figure 3:
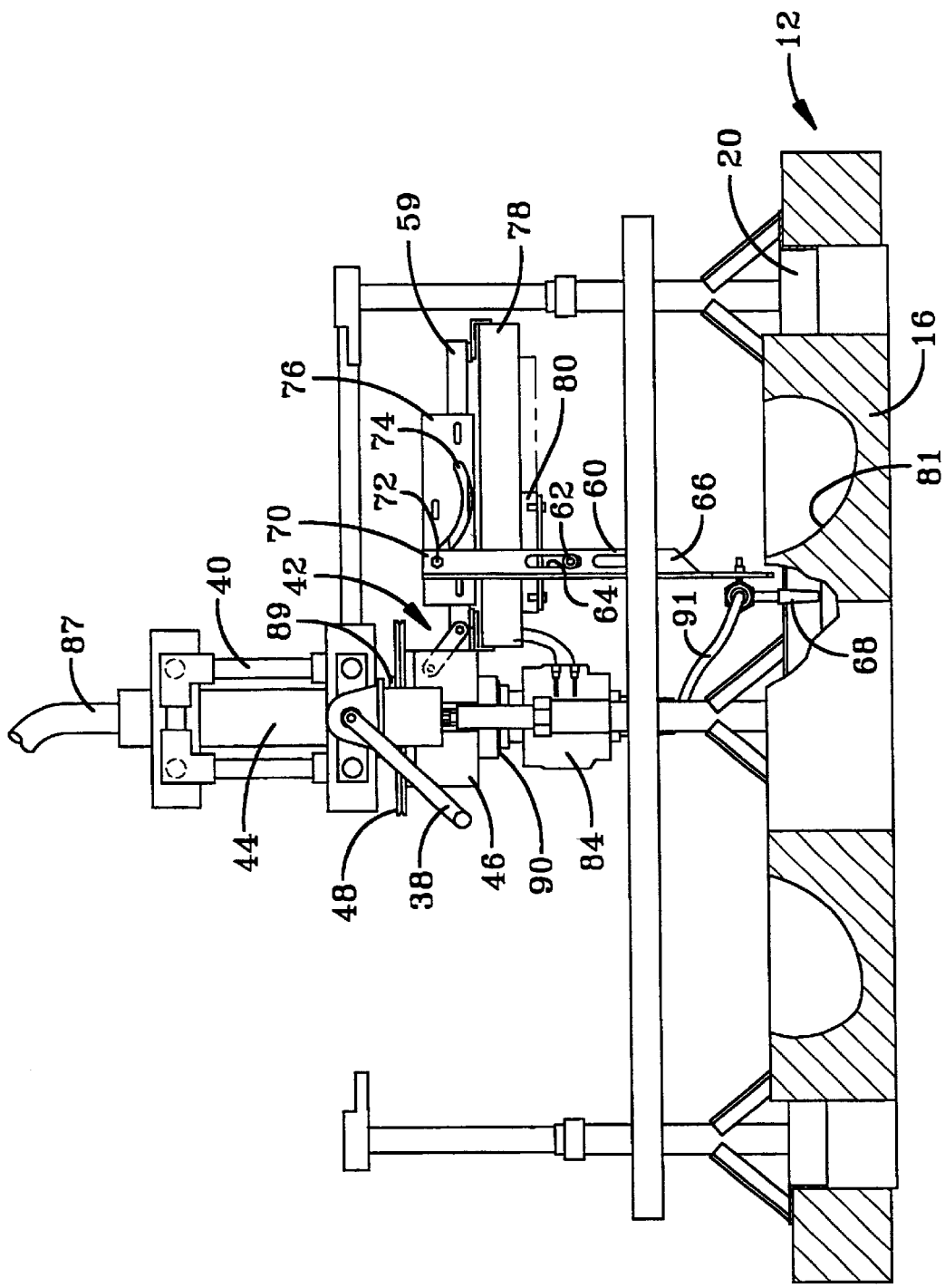
FIG. 3 is a side view of the apparatus of FIG. 1 taken along line 3—3 in FIG. 1 showing the nozzle in position for cleaning the lower mold half shown in cross section and with parts broken away.
Figure 4:
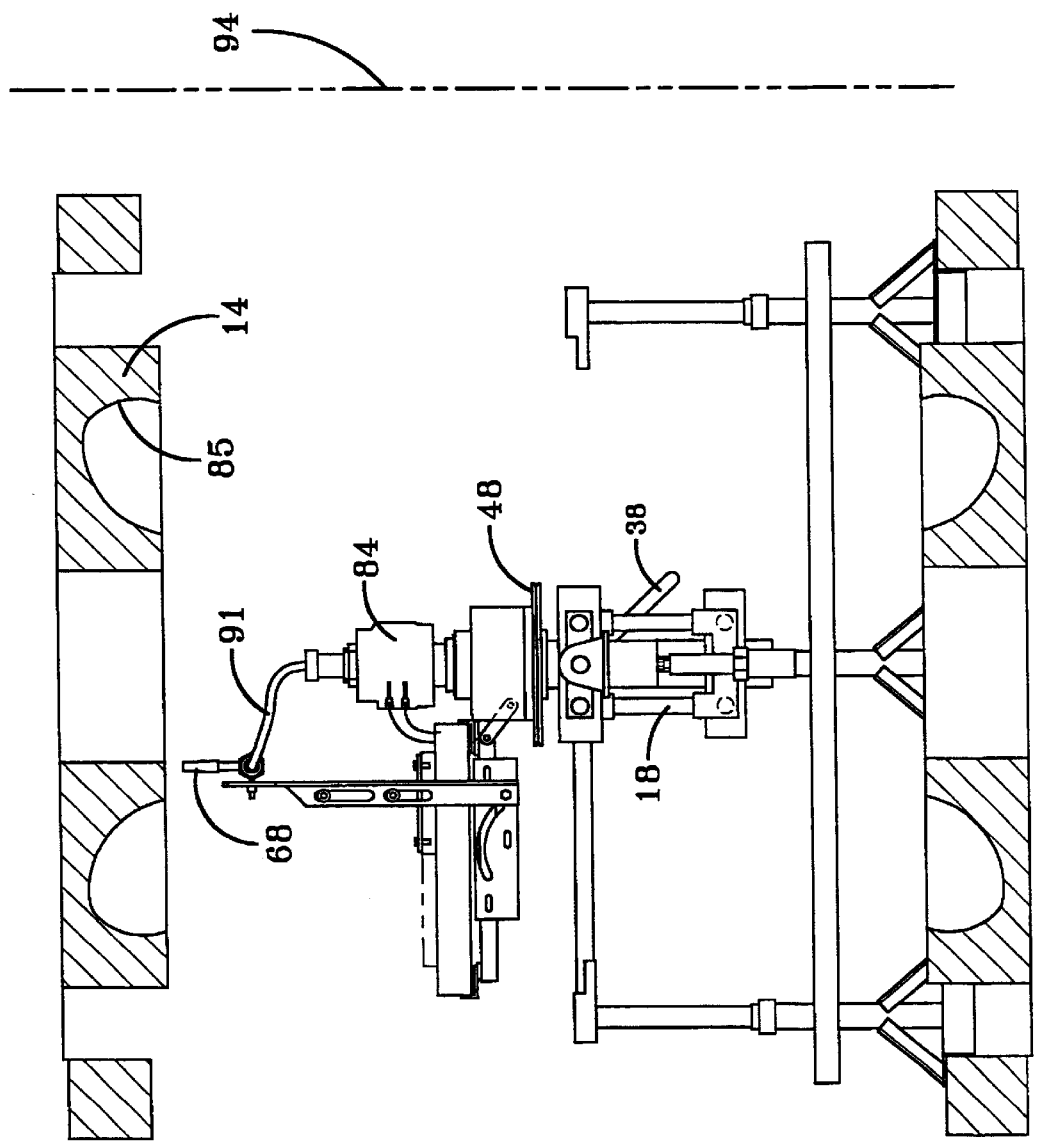
FIG. 4 is a side view like FIG. 3 showing the nozzle in position for cleaning the upper mold half which is shown in cross section. The position of the sound curtain is also shown in dotted lines

Referring to FIGS. 2, 3 and 4, a manifold 44 is mounted on the rotatable frame 40. The upper mold half 14 is positioned directly over the lower mold half 16. A hub 46 is rotatably mounted on the manifold 44 and connected to a pulley 48 which is driven by a belt 50 trained around a pulley 51 having a shaft driven by a motor 52 which may be mounted on the rotatable, frame 40.

A supporting arm 59 is mounted on the hub 46 and supports a stabilizer bracket 60 having guide rollers 62 for engaging the sides of slot 64 in a control arm 66 which supports a nozzle 68. An upper end 70 of the control arm 66 has a cam roller 72 rotatably supported in a cam slot 74 of a depth gauge 76 fastened to the supporting arm 59.

A rodless cylinder 78 is mounted on the supporting arm 59 and has a piston member 80 connected to the stabilizer bracket 60 for moving the stabilizer bracket and the control arm 66 in a radial direction across the mold surface so that the cam slot 74 and the cam roller 72 control the movement of the nozzle 68 at positions spaced from the mold surface and which conform with the contour of a mold surface 81 of the lower mold half 16 and the contour of a mold surface 85 of the upper mold half 14.

In addition to controlling the position of the nozzle 68 across the width of the mold cavity 81 in the lower mold half 16, the position of the nozzle circumferentially of the mold is provided by the motor 52 which rotates the drive pulley 51, causing the belt 50 to rotate the pulley 48 and traverse the nozzle 68 around the circumference of the lower mold half 16. A rotary union 84 may be mounted on the hub 46 and supports a connecting hose 87 in communication with a source of cleaning material such as frozen CO2. Bearings 89 and 90 at the ends of the hub 46 permit rotation of the hub relative to the manifold 44 and the rotary union 84.

In operation, as shown in FIG. 4, the cleaning process begins at the outside diameter of an upper mold half 14 of the press 12. The upper mold cavity may then be cleaned by projecting the CO2 and air through the nozzle 68, controlling the rotation of the nozzle by regulating the speed of the DC motor 52 and regulating the movement of the nozzle 68 across the mold cavity 21 by controlling the movement of the rodless cylinder 78. After the nozzle 68 makes one revolution, it makes contact with a proximity switch, which activates the rodless cylinder 78 causing the nozzle 68 to move inwardly approximately 0.46 inches (1.17 cm). When the nozzle 68 moves inwardly, it follows the cam slot 74, which is contoured to the shape of the mold cavity 85. This maintains equal pressure and nozzle spray width on the surface of the mold cavity 85 at all times. When the nozzle 68 reaches the inside diameter of the upper mold half 14 it trips another proximity switch which ends the cycle. At this point, the nozzle 68 will no longer be indexed inwardly; however, it will continue to revolve until the motor 52 is turned off. The purpose of keeping the motor 52 running is to allow the CO2 lines to be blown clear, and avoid projecting frozen CO2 on one spot. Suitable controls may be provided to regulate the speed of the motor 52 for rotating the hub 46 at a desired speed. These controls may also be coordinated is with the controls for the rodless cylinder 78 to provide the desired travel of the nozzle 68 radially across the lower mold surface 81 of the lower mold half 16 and the mold surface of the upper mold cavity 85. Once the cycle is completed and the upper mold half 14 has been cleaned, the crank 38 may be rotated causing the unit supporting frame 18 to be revolved and the nozzle 68 to be aligned with a lower mold surface 81 in the lower mold half 16 as shown in FIGS. 2 and 3. The operation may then be repeated to clean the lower mold surface 81.

The motor 52 is a variable speed DC motor, whereby the operator has the ability to slow down the speed of rotation of hub 46 which is desirable because the cleaning is more efficient at slower speeds.

In order to provide air for cleaning and also provide air for the rodless cylinder 78 an air line 86 in communication with a source of air under pressure is connected to the manifold 44. A second flexible supply line 87 in communication with a supply of frozen CO2 gas under pressure is connected to the manifold 44. A supply line 91 is provided from the manifold 44 to the nozzle 68.

Suitable controls may be provided to regulate the speed of the motor 52 for rotating the hub 46 at a desired speed. These controls may also be coordinated with the controls for the rodless cylinder 78 to provide the desired travel of the nozzle 68 radially across the mold surface 81 of the lower mold half 16 and mold surface of the upper mold cavity 85.

The apparatus 10 is placed in the lower mold 16 with the angle iron base 20 seated in the press breech ring 21 by a fork lift 92 as shown in dotted lines in FIG. 1. The upper mold half 14 is positioned directly over the lower mold half 16. The upper mold cavity 85 may then be cleaned by projecting the CO2 and air through the nozzle 68, controlling the rotation of the nozzle by regulating the speed of the DC motor 52 and regulating the movement of the nozzle 68 across the mold cavity 21 by controlling the movement of the rodless cylinder 78. The crank 38 is then locked in position and the rotation of the nozzle 68 is controlled by regulating the speed of the motor 52 for traversing circumferentially around the lower mold cavity 21, and movement radially of the nozzle across the lower mold cavity is controlled by the rodless cylinder 78. Then the upper mold 14 can be moved away from the lower mold 16 and from the CO2 cleaning unit 42. The CO2 cleaning unit 42 may then be lifted out of the lower mold 16 by the forklift 92 and moved to another mold in another press without requiring any alteration of the tire presses. As shown in FIG. 4, a sound curtain 94 is positioned around the tire mold and mold cleaning apparatus.

What is claimed is:

1. A cleaning apparatus for cleaning the mold mounted in a tire press, said tire press having an upper mold half positioned over a lower mold half and movable vertically to open and close said mold comprising:
    (a) a supporting frame for mounting over said lower mold half and under said upper mold half;
    (b) a rotatable frame mounted on said supporting frame for rotation about a horizontal axis;
    (c) a source of frozen $CO_2$
    (d) a nozzle for spraying said frozen $CO_2$ cleaning material on mold surfaces of said upper mold half and said lower mold half said nozzle being mounted on a control arm supposed on said rotatable frame;
    (e) means to rotate said rotatable frame about said horizontal axis to move said control arm from a down position for spraying said frozen $CO_2$ cleaning material on said lower mold half to an up position for spraying said frozen $CO_2$ cleaning material on said upper mold half; and,
    (f) means to traverse said control arm circumferentially of said tire mold about a vertical mold axis wit said rotatable frame in said down position and in said up position.

2. The cleaning apparatus of claim 1 further comprising said rotatable frame having adjustable vertical legs and being supported for rotation on a shaft mounted in bearings supported an said adjustable vertical legs of said supporting frame and including means for adjusting the length of said legs to provide the desired height of said shaft between said lower mold half and said upper mold half.

3. The cleaning apparatus of claim 1 further comprising a sound curtain positioned around said cleaning apparatus and said tire mold.

4. The cleaning apparatus of claim 1 further comprising means for adjusting said control arm in vertical direction toward and away from a surface of said upper mold half and a surface of said lower mold half to maintain a predetermined distance between said nozzle and said surface of said upper mold half and said surface of said lower mold half.

5. The cleaning apparatus of claim 1 further comprising said means to traverse said control arm circumferentially of said tire having a hub member mounted on said rotatable frame and supporting said control arm, said hub member being rotatable about said vertical mold axis in said down position and in said up position of said control arm.

6. The cleaning apparatus of claim 1 further comprising said cleaning material being frozen $CO_2$ and said nozzle being in communication with said source of frozen $CO_2$ carried by air under pressure to project the spray of cleaning material against said upper mold surface and said lower mold surface.

7. The cleaning apparatus of claim 4 further comprising said means for adjusting the vertical position of said control arm including a cam roller mounted on said control arm and a depth gauge member mounted on said rotatable frame having a cam slot with a cam surface for said cam roller.

8. The cleaning apparatus of claim 4 further comprising means for moving said control arm radially of said tire mold to traverse said nozzle over the surface of said upper mold half and the surface of said lower mold half after a predetermined circumferential traverse of said control arm and said nozzle.

9. The cleaning apparatus of claim 8 further comprising a rodless piston cylinder assembly connected to said rotatable frame and to said control arm for moving said arm in said radial direction relative to said lower mold surface and said upper mold surface.

10. A method of clean a tire mold having an upper mold half positioned over a lower mold half and movable vertically to open and close said mold with a portable cleaning apparatus having a supporting frame, a rotatable frame mounted on said supporting frame, a nozzle for spraying frozen $CO_2$ cleaning material mounted on a control arm supported on said rotatable frame and in communication with a source said frozen $CO_2$ of cleaning material comprising the steps of:

(a) mounting said supporting frame over said lower mold half;

(b) rotating said frame to a position with said control arm in an up position wherein said nozzle in directed at a mold surface of said upper mold half;

(c) communicating said frozen $CO_2$ cleaning material to said nozzle to project said from $CO_2$ cleaning material against said mold surface of said upper mold half;

(d) rotating said control arm to traverse said nozzle circumferentially of said upper mold half;

(e) cleaning said mold surface of said upper mold half by spraying said frozen $CO_2$ cleaning material with said nozzle;

(f) rotating said rotatable frame to a position with said control arm in a down position wherein said nozzle is directed at a mold surface of said lower mold half;

(g) rotating said control arm to traverse said nozzle circumferentially of said lower mold half on said control arm for cleaning said mold surface of said lower mold half with said frozen $CO_2$ cleaning material; and, (h) removing said cleaning apparatus from said lower mold half for use in cleaning another tire mold.

11. The method of claim 10 further comprising moving said control arm radially of said upper mold half and said lower mold half after a predetermined circumferential traversing of said nozzle to spray said frozen $CO_2$ cleaning material over said mold surface.

12. The method of claim 10 further comprising adjusting the vertical position of said control arm as said nozzle is moved radially of said upper mold half and said lower mold half to maintain a predetermined spacing between said nozzle and said mold surfaces.

13. The method of claim 10 further comprising communicating said frozen $CO_2$ cleaning material to said nozzle and further communicating compressed air to said nozzle for spraying said frozen CO2 cleaning material on said mold surfaces.

14. The method of claim 10 further comprising traversing said nozzle circumferentially by rotating said control arm at a vertical axis on said rotatable frame.

15. The method of claim 14 comprising controlling the speed of rotation of said frozen $CO_2$ control arm and the flow of said cleaning material to provide cleaning of said mold surfaces as said nozzle is traversed and further adjusting the position of said control arm radially of said upper mold half and said lower mold half after a predetermined rotation of said nozzle about said vertical axis.

* * * * *

UNITED STATES PATENT AND TRADEMARK OFFICE
CERTIFICATE OF CORRECTION

PATENT NO. : 6,368,417 B1  
DATED : May 2, 2002  
INVENTOR(S) : David Joseph Weber It is certified that error appears in the above-identified patent and that said Letters Patent is hereby corrected as shown below:

Column 4,  
Line 43, after "CO2" insert -- cleaning material --.  
Line 46, after "half" insert a comma.  
Line 47, delete "supposed" and substitute -- supported --.  
Line 55, delete "wit" and substitute -- with --.  
Line 63, delete "shaft" and substitute -- supporting frame --.

Column 5,  
Line 9, after "tire" insert -- mold --.  
Line 35, delete "clean" and substitute -- cleaning --.  
Line 47, delete "in" and substitute -- is --.

Column 6,  
Line 38, delete "at" and substitute -- about --.  
Line 41, delete "frozen CO2."  
Line 42, before "cleaning" insert -- CO2 --.

Signed and Sealed this

Twenty-fourth Day of September, 2002

*Attest:*

JAMES E. ROGAN  
*Attesting Officer*   *Director of the United States Patent and Trademark Office*